United States Patent [19]
Warthen et al.

[11] Patent Number: 5,714,424
[45] Date of Patent: Feb. 3, 1998

[54] MULTI-COMPONENT POLYOLEFIN CATALYSTS

[75] Inventors: John L. Warthen; Rimantas Glemza, both of Baltimore, Md.

[73] Assignee: W. R. Grace & Co.-Conn., New York, N.Y.

[21] Appl. No.: 370,045

[22] Filed: Jan. 9, 1995

[51] Int. Cl.$^6$ .................................................. B01J 31/00
[52] U.S. Cl. .......................... 502/105; 502/104; 502/117; 502/308; 502/309; 502/319
[58] Field of Search .................. 502/319, 308, 502/309, 104, 105, 117

[56] References Cited

U.S. PATENT DOCUMENTS

| | | | |
|---|---|---|---|
| 3,798,202 | 3/1974 | Nasser | 260/88.2 |
| 4,263,422 | 4/1981 | Lowery, Jr. et al. | 526/97 |
| 4,307,209 | 12/1981 | Morita et al. | 525/246 |
| 4,391,736 | 7/1983 | Capshew | 252/429 |
| 4,540,757 | 9/1985 | McDaniel | 526/128 |
| 4,560,733 | 12/1985 | Sturdy et al. | 526/129 |
| 5,034,364 | 7/1991 | Kral et al. | 502/117 |
| 5,198,400 | 3/1993 | Katzen et al. | 502/113 |
| 5,231,066 | 7/1993 | Rekers et al. | 502/239 |
| 5,237,025 | 8/1993 | Benham et al. | 526/114 |
| 5,248,643 | 9/1993 | Patil et al. | 502/67 |
| 5,330,950 | 7/1994 | Hsieh | 502/113 |
| 5,408,015 | 4/1995 | Hsieh et al. | 502/113 |

FOREIGN PATENT DOCUMENTS

| | | |
|---|---|---|
| 789870 | 4/1973 | Belgium . |
| 0188658 | 7/1986 | European Pat. Off. . |
| 0291824 | 11/1988 | European Pat. Off. . |
| 0416786 | 3/1991 | European Pat. Off. . |
| 0447070 | 9/1991 | European Pat. Off. . |
| 0591968 | 4/1994 | European Pat. Off. . |
| 0647661 | 4/1995 | European Pat. Off. . |

OTHER PUBLICATIONS

Conner, W.C., et al., "The Relationship Between Catalyst Morphology and Ethylene Polymerization,".

Webb, S. W. et al., "Morphological Influences in the Gas Phase Polymerization of Ethylene by Silica Supported Chromium Oxide Catalysts," The Canadian Journal of Chemical Eng'ing, vol. 69, Jun., 1991.

McDaniel, M.P., et al., "Ethylene Polymerization Catalysts from Supported Organotransition Metal Complexes," J. of Catalysis, vol. 120, pp. 170–181 (1989).

Weist, E. L., et al., "Morphological Study of Supported Chromium Polymerization Catalyst. 1. Activation" Macromolecules, vol. 20, pp. 689–693 (1987).

Conner, W. C., et al., "Use of X-ray Microscopy and Synchrotron Microtomography to Characterize Polyethylene Polymerization Particles," Macromolecules, vol. 23, pp. 4742–4747 (1990).

Munoz-Escalona, A., et al., "Catalytic Activity and Control of Nascent Morphology of Polyethylenes Obtained with First and Second Generation of Ziegler–Natta Catalysts," J. of Applied Polymer Science, vol. 29, pp. 1187–1202 (1984).

Benham, E.A. et al., "Mixed Organo/Oxide Chromium Polymerization Catalysts," J. Macromol. Sci.–Chem. A25(3), pp. 259–283 (1988).

(List continued on next page.)

Primary Examiner—Michael Lewis
Assistant Examiner—Thomas G. Dunn, Jr.
Attorney, Agent, or Firm—Robert A. Maggio

[57] ABSTRACT

The present invention encompasses a monolithic multi-component composite polyolefin catalyst particle comprising at least two distinct supported catalyst components wherein each catalyst component is capable of producing a resin having a melt index different from at least one other catalyst component under constant reaction conditions. Methods of producing and using the multi-component catalyst are disclosed.

6 Claims, 2 Drawing Sheets

■ HIGH MI COMPONENT
▨ MEDIUM MI COMPONENT
☐ LOW MI COMPONENT

OTHER PUBLICATIONS

McDaniel, M.P., "Controlling Polymer Properties with the Phillips Chromium Catalysts", Ind. Eng. Chem. Res. vol. 27, pp. 1159–1564, (1988).

Weist, E. L., et al., "Morphological Study of Supported Chromium Polyerization Catalysts. 2. Initial Stages of Polymerization", Macromolecules, vol. 22, pp. 3244–3250 (1989).

Freeman, J. W., et al., "Ethylene Polymerization Over Organochromium Catalysts: A Comparison Between Closed and Open Pentadienyl Ligands".

Karol, F. J., "Ethylene Polymerization Studies with Supported Cyclopentadienyl, Arene, and Allyl Chromium Catalysts", J. of Polymer Science, vol. 13, pp. 1607–1617 (1975).

Marsden, C.E. et al., "The Influence of Silica Support on Polymerization Catalyst Performance," Preparation of Catalysts V, (1991) pp. 215–227.

■ HIGH MI COMPONENT
▨ MEDIUM MI COMPONENT
☐ LOW MI COMPONENT

■ HIGH MI COMPONENT

▨ MEDIUM MI COMPONENT

☐ LOW MI COMPONENT

MULTI-COMPONENT POLYOLEFIN CATALYSTS

BACKGROUND OF THE INVENTION

In the field of polyolefin manufacture, much attention has been devoted to finding new and improved catalysts capable of producing polyolefins having unique and/or improved properties or capable of producing such polyolefins in more economical processes.

One concern in polyolefin manufacture is the ability to control the molecular weight distribution of the resulting polymer product. Broad molecular weight distributions have been linked to improved processability and improved performance in the resulting polymer. Single catalyst systems typically produce a fairly narrow range of molecular weight.

Broadened molecular weight distributions have been obtained by physically (melt) blending polymers of differing molecular weights. Sequential reactors (with different polymerization conditions) have also been used to achieve broadened molecular weight distributions. Unfortunately, these techniques add significantly to the manufacturing cost.

Attempts have been made to broaden the molecular weight distribution resulting from a single polymerization. In some instances, physical admixtures of different supported catalysts have been used, but the resulting polymer tends to be a heterogeneous mixture which requires significant physical blending to produce a homogeneous polymer of broad molecular weight distribution.

U.S. Pat. No. 5,231,066, discusses the merits of very broad molecular weight distribution plastics and discloses a silica catalyst support having bimodal pore size distribution used in an attempt to obtain broader molecular weight distribution polymers. However, these teachings do not address the problems that arise from using different pore radii supports in that smaller pores have much higher surface area than the larger ones and thus will be much more active and produce the majority of its respective resin. In effect, the two modes cannot be matched with respect to activity due to the large differences in surface area. Furthermore, the melt index (which varies inversely with the molecular weight average) between the two resins produced by the two modes is not large enough to broaden the molecular weight distribution significantly. Thus, for modes at 75 A and 200 A, the difference in the melt index of the polymer produced will be much less than a factor of 10, and the resulting molecular weight broadening will be small.

The present invention overcomes these short comings in that the present invention does not depend in any manner on the pore structure of the support. In fact, the present invention will succeed in the event when all components have the same pore size distributions (including same surface area, average pore radii, and pore volume).

Furthermore, the present invention is useful for combining many catalyst systems including, chromium silica, Ziegler-Natta and metallocene catalyst systems.

SUMMARY OF THE INVENTION

The objective of the present invention is to provide a polyolefin catalyst composition that overcomes the above mentioned problems and that is capable of producing resins having widely varying molecular weight distributions and having differing melt index values under the same polymerization conditions.

The invention provides monolithic composite catalyst particles capable of achieving broadened molecular weight distribution polyolefins in a single polymerization step.

The invention further provides methods for making monolithic composite catalyst particles.

The monolithic multi-component composite composition according to the present invention is a catalyst particle that is a physical blend of at least two catalyst components, wherein each catalyst components is capable of producing a resin with widely different molecular weight distributions ("MWD") and having different melt index values under the same polymerization conditions. The resulting polymer material will be an intimate blend of resins in a single reactor, potentially having a widely variable MWD, which will form a homogenous plastic under normal extrusion conditions.

Equally important is that the composition of the present invention has a high catalytic activity and produces resins under commercially practical conditions which have reduced Die Swell ("DS") without sacrificing Environmental Stress Crack Resistance ("ESCR"), High Load Melt Index/Melt Index ratio or flexular modulus.

In one aspect, the invention encompasses a multi-component composite polyolefin catalyst particle comprising at least two distinct supported catalysts components wherein the melt index potential of each supported catalyst component differs from the melt index potential of at least one other supported catalyst component of the particle whereby each distinct component of said composite particle is capable of simultaneously catalyzing the formation of polymers of different melt index under constant reaction conditions.

In another aspect, the invention encompasses methods of forming monolithic multi-component composite catalyst particles, the method comprising:

a) choosing at least two catalyst components wherein each component is capable of yielding a polyolefin having differing melt indices;

b) sizing the catalyst components to select components having a size in the range of about 2–20μ, sufficient to permit the components to bind to one another;

c) dispersing said components in a non-reactive solvent to form a slurry; and d) isolating the resulting catalyst particle from the solvent.

Isolation can be accomplished by a number of means, including but not limited to spray drying and solvent exchange followed by drying.

Steps b) and c) may optionally be performed in reverse order.

If the catalyst components are based on $Cr/SiO_2$ or $Cr/Ti/SiO_2$ systems, then the resulting multicomponent catalyst must be calcined, preferably in air, preferably above approximately 1000° F. (532° C.), and preferably in the range of about 1200°–1600° F. (642° C. to 862° C.) prior to polymerization.

Figure 1:
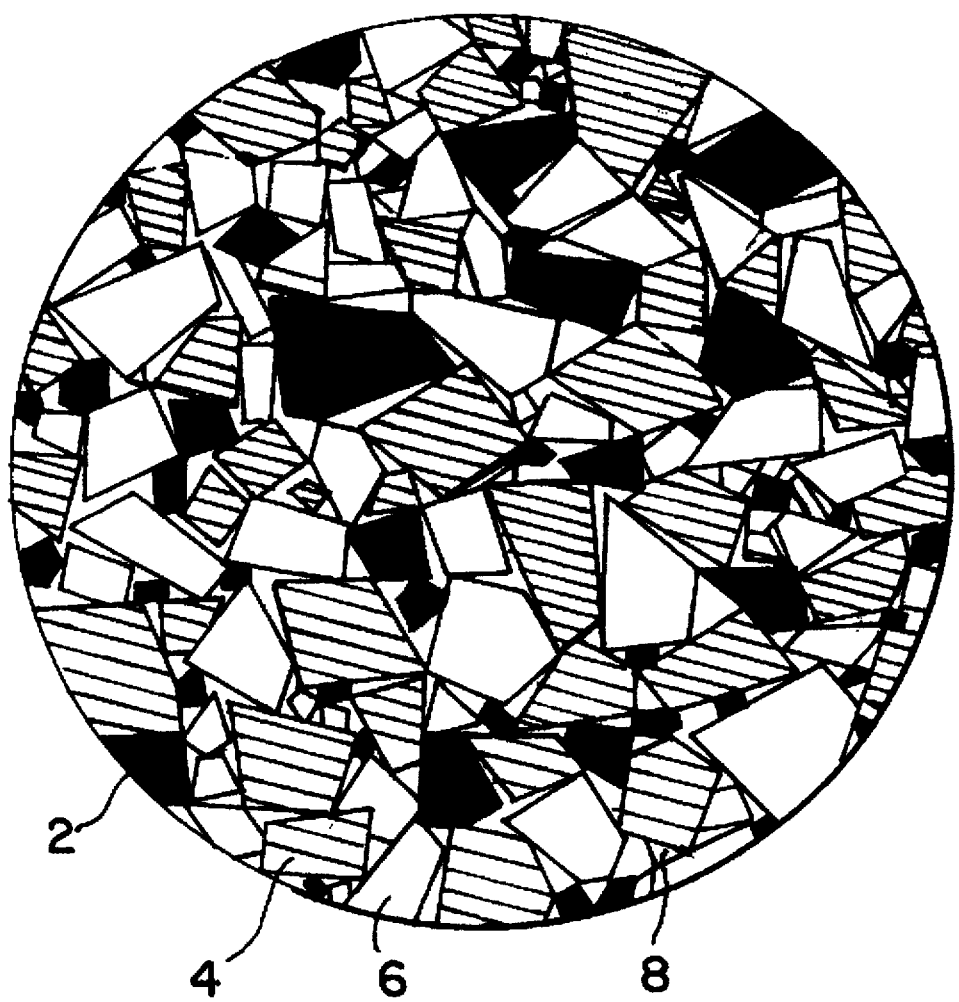
FIG. 1 is an illustration of the spherical embodiment of the present invention illustrating a three component particle made up of high, medium and low melt index catalyst components.
Figure 2:
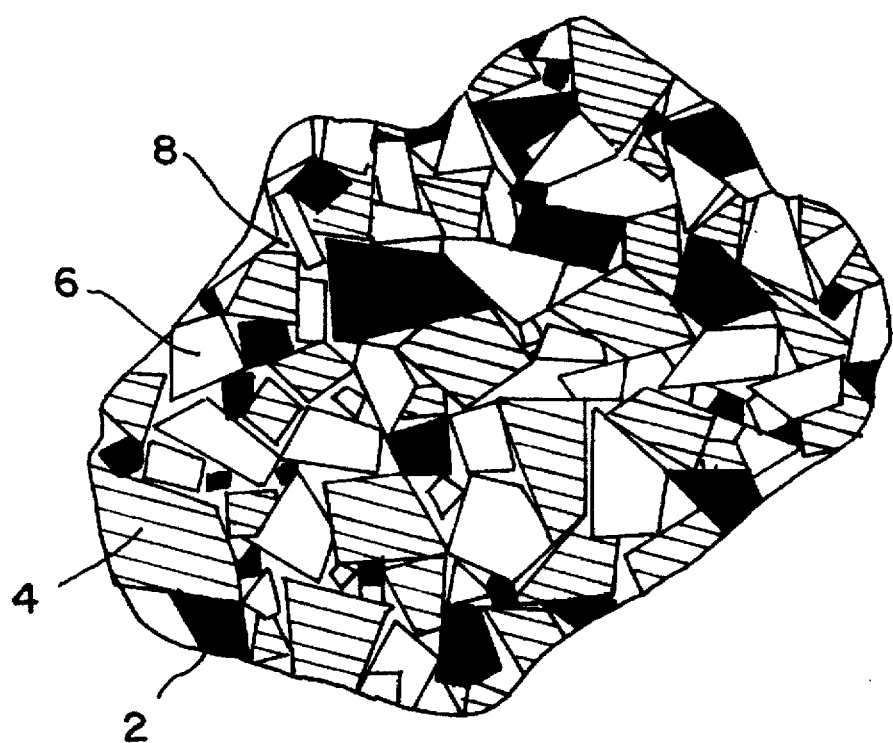
FIG. 2 is an illustration of a non-spherical, irregularly shaped embodiment of the present invention illustrating a three component particle made up of high, medium and low melt index catalyst components.

In each of these illustrations the composite is shown to have three discrete components where 2 represents the high melt index component, 4 represents a medium melt index component, and 6 represents the low melt index component and 8 represents the space between the components. Space 8 can be void, or filled with air or binder materials such as silica sol, alumina sol, polymeric materials and the like. While these illustrations show embodiments of this invention having three discrete catalytic regions, these illustrations are not meant to be limiting the invention to the use of three components.

DETAILED DESCRIPTION OF THE INVENTION

The present invention encompasses a monolithic multi-component composite polyolefin catalyst particle comprising at least two distinct supported catalyst components wherein each catalyst component is capable of producing a resin having a melt index different from at least one other catalyst component under constant reaction conditions.

The monolithic multi-component composite can have a spherical or irregular shape and a rough or smooth surface. The distinct components of the composite are selected from the group consisting of chrome-silicas, chrome-titania silicas, chrome-silica titania tergels, Ziegler-Natta compositions, metallocenes and mixtures thereof. The weight fraction of each supported catalyst in the particle in the multicomponent composite is inversely proportional to the relative activity of each supported catalyst. The multicomponent composite preferentially has average size in the range of about 20–300μ and said distinct components preferentially are about 2–20μ in size.

The composition of the present invention does not depend in any manner on the pore structure of the support. The only requirement is that the individual components have different melt index potentials, i.e., be capable of producing resins having widely different melt indices, and that have approximately the same activity. Moreover, the melt index of the polymers capable of being produced by the components have a ratio of (from highest to lowest) of at least of 10, and preferably more than 50.

As used herein the term polymerization includes copolymerization and terpolymeriztion and the terms olefins and olefinic monomer includes olefins, alpha-olefins, diolefins, styrenic monomers, acetylenically unsaturated monomers, cyclic olefins and mixtures thereof.

"Support" or "carrier" are interchangeable and shall mean any sufficiently porous material like talc, 10 inorganic oxides such as Group IIA, IIIA, IVA or IVB metal oxides (such as silica, alumina, silica-alumina, magnesia, silica-magnesia, silica-alumina-titania, titania, silica-titania, zirconia); multi-component porous materials (e.g., co-gels, tergels, quadragels, co-precipitates, co-crystalized materials and the like etc.); aluminum phosphate; metal halides; chemically surface modified materials such as calcined silica, silanized silica, aryloxylated silica, alkoxylated silica, metal halide treated silica and the like; and resinous materials (such as finely divided polyethylene or polystyrene) and mixtures of all of the foregoing materials; preferably silica, alumina, silica-alumina, silica-titania, titania, magnesia, silica-magnesia and aluminum phosphate gel, metal halides (preferably $MgCl_2$ and $ZnCl_2$) and mixtures thereof.

"Metallocene" is defined as organometallic compounds having a transition metal, including rare earth metals, in coordination with members of at least one five-member carbon ring, heterosubstituted five-member carbon ring, or a bridged (ansa) ligand defined as two cyclic moieties capable of coordinating to the transition or rare earth metals.

Wherein the ansa bridge B, can be carbon, silicon, phosphorus, sulfur, oxygen, nitrogen, germanium, species such as $CH_2CH_2$ (ethylene), $Me_2Si$ (dimethylsilyl), $Ph_2Si$ (diphenylsilyl) $Me_2C$ (isopropylidene), $Ph_2P$ (diphenylphosphoryl) $Me_2SiSiMe_2$ (tetramethyldisilane) and the like. In particular, preferred metallocenes are derivatives of a cyclopentadiene (Cp), including cyclopentadienyl, indenyl, fluorenyl, tetrahydroindenyl, and 1,1-disubstituted silacyclopentadienes, phosphocyclopentadienes, 1-metallocyclopenta-2,4-dienes, bis(indenyl)ethane and mixtures thereof.

The transition metal component of the metallocene is selected from Groups IIIB through Group VIII of the Periodic Table and mixtures thereof, preferably Group IIIB, IVB, VB, VIB and rare earth (i.e., lanthanides and actinides) metals, and most preferably titanium, zirconium, hafnium, chromium, vanadium, samarium and neodymium. Of these Ti, Zr, and Hf are most preferable.

"Ziegler-Natta" ("ZN") is defined as a transition metal (Group IIIB through VIIIB) halide, alkyl, aryl, or alkoxy compounds and mixtures thereof in combination with a Group I through III elements of the Periodic Table. A typical example is $TiCl_4$ and $AlEt_3$.

The present invention can be used to produce polymers using solution polymerization, slurry polymerization or gas phase polymerization techniques. Method and apparatus for effecting such polymerization reactions are well known. The catalyst according to the present invention can be used in similar amounts and under similar conditions to known olefin polymerization catalysts.

Typically, for the slurry process, the temperature is from approximately 0 degrees C. to just below the temperature at which the polymer becomes soluble in the polymerization medium. For the gas phase process, the temperature is from approximately 0 degrees C. to just below the melting point of the polymer. For the solution process, the temperature is typically the temperature from which the polymer is soluble in the reaction medium up to approximately 275 degrees C.

The pressure used can be selected from a relatively wide range of suitable pressures, e.g., from subatmospheric to about 350 Mpa. Suitably, the pressure is from atmospheric to about 6.9 Mpa, or 0.05–10 MPa, especially 0.14–5.5 Mpa. In the slurry or particle form process, the process is suitably performed with a liquid inert diluent such as a saturated aliphatic hydrocarbon. Suitably the hydrocarbon is a $C_4$ to $C_{10}$ hydrocarbon, e.g., isobutane or an aromatic hydrocarbon liquid such as benzene, toluene or xylene. The polymer is recovered directly from the gas phase process or by filtration or evaporation from the slurry process or evaporation from the solution process.

The catalyst of the present invention are particularly suited for the slurry process.

EXAMPLES

The following examples were carried out using the following materials.

1. Zero Melt Index ("MI") component: washed filter cake silica;
2. Medium MI component: Dried, coarse milled to 100 microns, washed silica hyrdogel; and
3. High MI component: Dried silica/titania cogel sized for convient handling followed by calcining at about 1500° F. (814° C.).

The above support materials are silicas or titania/silicas. They are sized and slurried in water, then sandmilled to fine particles (less than 10 microns), and mixed in proper proportions. The catalyst component is made by adding soluble Cr salt to this multi-component silica slurry to a level of about 1.0% Cr on total solids basis, and the mixture is then spray dried to produce spherical catalyst particles with average particle size of about 40 microns. Each particle contains an intimate mixture of the three components, each having different MI potentials.

Another modification of the above involves mixing the three slurries prior to final milling, and feeding the mix into the sandmill, milling all three components simultaneously (referred herein as "termilling"). Thus all three components undergo final comminution at the same time. Still another modification involves adding Cr salt prior to sandmilling.

In the separate milling procedure, Cr can be added separately to each slurry prior to mixing. Each slurry can then be treated independently to change the nature of Cr species in water prior to mixing and spray drying.

The final sandmilled slurry was filtered at a rate to prevent fast sedimentation, then washed with a low molecular weight alcohol, followed by complete exchange with this alcohol and drying under vacuum. Sizing of the dried mix produced particles that were intimate mixtures of the three components, and thus function as an multicomponent ("MC") catalyst. An alternate way is to reslurry the solvent exchanged cake in its own solvent and spray dry under oxygen free conditions to produce spherical catalyst particles.

An alternate composition had only two components: #1 and #3. To produce this alternative, a dried silica/titania cogel pre-sized through a 325 mesh is added to a slurry of #1. Chromium was added; the slurry was filtered; and the filter cake under went solvent exchange with alcohol and dried. An alternate to this is solvent spray drying.

Example 1 is the control, which was made from pure component #2. This preparation is used as reference to show the Die Swell advantages of Examples 3–13. The latter have very little of component #2.

It is well known that ESCR and DS of resins made from single component Cr/silica or Cr/Ti/silica catalysts are normally related; that is, as the properties of the catalyst are changed to increase the ESCR, DS goes up as well, and vice versa. Comparison of Examples 3–13 with example 1 (control) clearly illustrates that we managed to reverse this ESCR/DS relationship, which allows for production of superior resins. The lowering in DS is very significant, while ESCR was constant or slightly higher.

The analyses of the following catalyst preparations are provided in Table I. Polymerization data using the catalysts prepared according to Example 1–13 is provided in Table II.

EXAMPLE 1

The sole component of this catalyst preparation is the coarse milled hydrogel. The hydrogel was coarse ground to about a ⅛ inch (3.2 mm) size and slurried with diionized ("DI") water to about 15% solids and this slurry is ground to about 100 microns. The ground slurry was pumped to a sandmill and finely ground. The collected product was passed once more through the sandmill to achieve an average particle size ("APS") of about 6.5μ and a solids content of about 14.6% by Ohaus moisture balance. $Cr(NO_3)_3*9H_2O$ was added to the sandmilled slurry to give 1.0% Cr and the pH was adjusted to 4.14 with ammonia.

The slurry was then spray dried. The product was collected and screened through 100 mesh and on 325 mesh and gave the following analyses:

| | |
|---|---|
| TV Total Volatiles, % | 8.49 |
| Cr, % | 1.36 |
| Ti, % | 0.07 |
| APS, μ | 50.3 |
| SA, m2/g | 309 |
| N2PV, cc/g | 1.55 |

EXAMPLE 2

This example is for an MC catalyst containing the three supports described above. The components used were:

23% dry basis ("DB") silica cake lab washed (2020.3 cake) at 14.8% solids;
54% DB coarse ground to 100 microns hydrogel $SiO_2$ (4808.2) at 14.6% solids; and 23% DB Cogel-$SiO_2$/Ti (2076.4) slurried calcined base at 14.4% solids.

The three component slurries were individually pumped to a sandmill and held separately until they were combined to the above concentration. The ground hydrogel was passed twice through the sandmill, the other two only once. The combined slurry had a 7.3μ average particle size. Solids concentration was 14.8% by Ohaus.

A total of 116.4 $Cr(NO_3)_3*9H_2O$ was added to the slurry and stirred for one hour. The slurry was then $NH_3$ stabilized to a pH of 4.39.

The slurry was then spray dried. The collected product was screened through 100 mesh and on 325 mesh.

The analyses of this catalyst are given in Table 1.

EXAMPLE 3

This example is for an MC catalyst made up of the three components of Example 2 but at the following concentrations (DB):

Silica cake-43%; coarse ground hydrogel-14%; and Cogel-43%.

The above components were treated in the following manner.

The ground hydrogel was milled sandmill and held. The silica cake and cogel slurries were combined and mixed with the sandmilled hydrogel and Cr acetate salt was added to the mix sufficient to give 1.0% Cr on the catalyst. The slurry, at 17% solids, was milled in a sandmill. The combined milling of the three slurries is noted as termilling. The termilled slurry was stirred overnight and spray dried the next morning. The collected product was screened through 100 mesh and on 325 mesh. The properties of this catalyst are given in Table

EXAMPLE 4

This example involves termilling of three catalytic supports, each support being individually impregnated with a chrome salt prior to mixing together and termilling in a horizontal mill. The three components are:

43% lab washed silica cake;
14% coarse ground hydrogel; and
43% calcined silica/titania cogel.

A total of 3814 of silica cake at 76.4% TV (900 $SiO_2$) was slurried with 923 DI $H_2O$. To this slurry was added 38.3 $Cr(NO_3)_3*9H_2O$ and the mixture stirred for one hour. The slurry was ammonia stabilized at a pH of 3.99. This component is calculated to yield 0.55% Cr. The second component (1723 of coarse ground and sandmilled hydrogel slurry at 83.0% TV(293 $SiO_2$).) was mixed with 6.2 chrome acetate and stirred for one hour. The slurry pH was adjusted to 3.9 using 2M $HNO_3$. This component is calculated to give 0.45% Cr. The third component was 918 $SiO_2$/Ti cogel at 2.0% TV(900 $SiO_2$/Ti). This was slurried in 4.224 of DI $H_2O$ and 19.09 of chrome acetate was added. It was allowed to stir for one hour. This component is calculated to give 0.44% Cr.

The three components were combined and stirred for one-half hour and then termilled to an average particle size of 9.2 microns and solid content of 16.9%. The slurry was pumped to a spray dryer and dried. The material then screened through 100 mesh and on 325 mesh (U.S. sieve) and the results shown in Table 1.

EXAMPLE 5

This catalyst was prepared the same as in Example 4 except the Cr target for the cake silica component was 1.0% instead of 0.55%. Thus $Cr(NO_3)_3*9H_2O$ was added to slurried silica cake and stirred for one hour. The slurry was $NH_3$ stabilized similar to Example 4.

The coarse ground and sandmilled hydrogel slurry was combined with Cr acetate salt to give 0.45% Cr and mixed for one hour. The pH was adjusted as in Example 4 and the slurry stirred another hour.

In the same manner the cogel component was slurried with Cr acetate to yield 0.45% Cr. The slurry was stirred for one hour; no pH adjustment was done.

All three components were combined and stirred one-half hour at a solids content of 18%. The mix was termilled as in previous examples to an average particle size of 8.2µ. This sandmilled slurry was then spray dried as in previous examples. The screened fraction, through 100 mesh and on 325 mesh, gave the properties shown in Table I.

EXAMPLE 6

The catalyst of this example had the same component composition of the catalysts in Examples 3, 4 & 5. The coarse ground hydrogel component was sandmilled once and combined with slurries of the silica cake and $SiO_2$/Ti cogel to give 16.5% solids consisting of 43% SYLOX, a silica oxide product sold by Grace Davison, a business unit of W. R. Grace & Co.-Conn., 14% $SiO_2$ originated from hydrogel and 43% cogel. This slurry was then milled in a sandmill.

The slurry pH was adjusted to 3.73 with 10% $HNO_3$. The target Cr level for this catalyst was 0.60% Cr. Sufficient Cr acetate was added to the slurry and stirred overnight. The slurry was spray dried in the same manner as in previous examples. Properties for the portion of collected product screened through 100 mesh and on 325 mesh are given in Table 1.

EXAMPLE 7

The catalyst of this example was similar to that of Example 6 except the target Cr level was 0.45% Cr. The three components were termilled in the same manner as for Example 6 and Cr acetate added after the sandmilled slurry's pH was adjusted. The slurry was spray dried and the properties of a screened (through 100 mesh and on 325 mesh) portion of collected product are given in Table 1.

EXAMPLE 8

The catalyst of this example was prepared the same as those in Examples 6 and 7 except the target Cr level was 0.30% Cr. After termilling the three components, adding Cr acetate and spray drying, a screened fraction (through 100 mesh and on 325 mesh) was obtained. The properties are given in Table 1.

EXAMPLE 9

The catalyst of this example is a two component MC catalyst using 50% SiO2/Ti cogel and 50% lab washed silica cake. These two components were combined with sufficient DI water to give 17.8% solids as a slurry. Sufficient Cr acetate was added to this slurry and stirred overnight. The Cr target for this catalyst was 1.0% Cr. The slurry was sandmilled as in previous examples and a portion of the sandmilled slurry was saved for another catalyst described in Example 12. The bulk of the sandmilled slurry was spray dried as in previous examples. The screened portion, through 100 mesh and on 325 mesh, was analyzed and properties given in Table 1.

EXAMPLE 10

The catalyst in this example was prepared from a portion of the Cr containing sandmilled slurry of the catalyst in Example 7. This portion was filtered on a glass-fritted Buchner funnel and the resulting cake was solvent exchanged with isopropanol. The cake was then dried in a vacuum for 48 hours.

The dried cake was gently ground by hand with a mortar & pestle and screened to collect a through 100 and on 325 fraction. The properties of this material are given in Table 1.

EXAMPLE 11

The catalyst in this example is a two component catalyst using 50% silica hydrogel catalyst fines (through 325 mesh) and 50% lab washed silica cake. 150 of hydrogel fines was added to 641 DI water and 146.5 isopropyl alcohol and slurried. To this was added 937.5 silica cake slurry containing 1.0% Cr from Cr acetate and the mixture was stirred overnight. The slurry was filtered on a Buchner filter, alcohol exchanged, dried in a vacuum oven and sized to through 100 mesh and on 325 mesh. The properties of this catalyst are given in Table 1.

EXAMPLE 12

This catalyst utilizes a portion of Cr containing sandmilled slurry of Example 9. The slurry was filtered on a Buchner filter, dried in a vacuum oven and sized to through 100 mesh and on 325 mesh. The properties of this catalyst are given in Table 1.

EXAMPLE 13

This MC catalyst is a three component catalyst using 60% lab washed DB cake silica, 20% coarse ground hydrogel DB and 20% $SiO_2$/Ti cogel DB. Each component was slurried in DI water to approximately 13% solids and separately pumped a sandmill with the hydrogel component being given a second pass through the sandmill. Portions of the three slurries were combined to give the above concentrations as follows:

Washed silica cake—6500 (780 DB);
Hydrogel-1925.9 (260 DB); and
Cogel $SiO_2$/Ti—2000 (260 DB).

This combined slurry, at 12.5% solids, had an average particle size of 8.0µ. A total of 116.4 $Cr(NO_3)_3*9H_2O$ was added to the slurry and stirred for 1 hour. The pH was stabilized to 4.31. After stirring overnight the pH fell to 3.48 where it was adjusted up to 4.17 using the $NH_3$. This slurry was spray dried as in previous examples. Properties of a screened (through 100 mesh and on 325 mesh) portion of the collected product are given in Table 1.

EXAMPLE 14

ETHYLENE POLYMERIZATION TESTS

About 30 cc of each catalyst were fluidized in a special quartz tube (4.8 cm O.D.) which had a sintered frit to support the sample. The fluidizing medium was very dry air, passed through beds containing activated alumina so that the moisture content corresponded to Dew Point of less than −100° F. (−73° C.). This fluidized bed was heated at the rate of 400° C./hr to final temperature of 1500° F. (807° C.)or 1300° F. (697° C.), where it was kept constant for 5.0 hrs. After that, the quartz tube with the sample was cooled to ambient temperature and the activated catalyst was transferred to a glass container for storage. All handling of the activated material was done under nitrogen.

Evaluation of the activated catalysts for the type of polyethylene produced during polymerization was done in 100°–107° C. range in a two-liter stirred autoclave. The temperature was controlled and held constant to within 0.25° C. by adjusting the pressure of boiling methanol in the jacket surrounding the reactor. After the autoclave, filled with Nitrogen, was heated to about 102° C., about 0.05 m of activated catalyst was transferred under Nitrogen blanket, followed by about one liter of liquid isobutane, which was prepurified by passing it through beds containing activated charcoal and alumina. Stirring was started and ethylene was supplied on demand to maintain 450 or 550 psig. Under these conditions the polyethylene produced does not dissolve in the isobutane, but remains in slurry form. About 7 min. after the reactor was pressurized, 3.0–5.0 cc 1-Hexene were added and the reaction was allowed to proceed at constant temperature to a final productivity of about 4.000 /g. All reactions were terminated by venting off isobutane and excess ethylene from the reactor.

The Melt Index of the final resin was determined using ASTM Proc. D1238-79, Cond. E, Procedure A; High Load Melt Index by ASTM Proc. D1238-79, Cond. F, Procedure B; and Density using ASTM D1505. ESCR was determined by ASTM D1693-70, Cond. B. Die Swell measurements were done by the method described in U.S. patent application Ser. No. 08/280,645 filed Jul. 26, 1994.

TABLE I

ANALYSES OF CATALYST PREPARATIONS

| | Example # | | | | | | | | | | | |
|---|---|---|---|---|---|---|---|---|---|---|---|---|
| | 2 | 3 | 4 | 5 | 6 | 7 | 8 | 9 | 10 | 11 | 12 | 13 |
| | 252 | TM414 | TM414 | TM414 | TM414 | TM414 | TM414 | 505 | TM414 | 505 | 505 | 622 |
| TV, % | 8.0 | 8.7 | 8.4 | 8.5 | 8.4 | 8.1 | 7.6 | 7.8 | 8.2 | 12.9 | | 9.6 |
| Cr, % | 1.13 | 0.81 | 0.59 | 0.72 | 0.67 | 0.46 | 0.36 | 0.98 | 0.32 | 0.66 | 0.58 | 1.16 |
| Ti, % | 0.07 | 1.22 | 1.17 | 1.16 | 1.15 | 1.17 | 1.14 | 1.33 | 1.13 | 1.03 | 1.26 | 0.63 |
| SA, m2/g | 283 | 278 | 274 | 253 | 273 | 283 | 261 | 261 | 285 | 266 | 248 | 227 |
| N2PV, cc/g | 1.35 | 1.21 | 1.17 | 1.11 | 1.2 | 1.24 | 1.23 | 1.12 | 1.42 | 0.95 | | 1.04 |
| APS, μ | 54.9 | 46.0 | 49.1 | 50.7 | 48.9 | 59.2 | 71.8 | 69.4 | | 143.6 | | 56.5 |

TABLE II

POLYMERIZATION DATA

| | | | | | | | | | RESIN PROPERTIES | | | | |
|---|---|---|---|---|---|---|---|---|---|---|---|---|---|
| EXAMPLE No. | ACTIV. TEMP. °F. | PRESS. TOTAL (psig) | 1-HEXEN cc | REACTION TEMP. °C. | RUN TIME (min) | WT. PLASTIC (gm) | PRODUCTIV. (gPE/gCAT) | MELT INDEX | HIGH LOAD MELT INDEX | RATIO HLMI/ MI | DENSITY | ESCR F50 (hr.) | % DIE SWELL |
| 1 | 1500 | 450 | 3.5 | 100.8 | 45 | 185 | 3470 | 0.38 | 33.4 | 87.7 | 0.9549 | 18 | 75.2 |
| 1 | 1500 | 450 | 3.5 | 100.8 | 52 | 178 | 4000 | 0.36 | 31.4 | 87.7 | 0.9548 | 18 | 73.3 |
| 2 | 1500 | 550 | 3.0 | 103.5 | 35 | 190 | 4030 | 0.31 | 24.1 | 79.0 | 0.9564 | 20 | 74.8 |
| 3 | 1500 | 450 | 3.5 | 103.2 | 41 | 218 | 3850 | 0.42 | 33.3 | 79.1 | 0.9547 | 14 | 65.3 |
| 4 | 1500 | 450 | 3.5 | 103.2 | 54 | 224 | 3920 | 0.31 | 22.7 | 72.5 | 0.9540 | 27 | 63.4 |
| 5 | 1500 | 550 | 3.0 | 106.0 | 36 | 222 | 4030 | 0.34 | 24.2 | 71.6 | 0.9559 | 16 | 67.2 |
| 6 | 1500 | 550 | 3.0 | 105.0 | 54 | 266 | 4160 | 0.29 | 20.4 | 70.6 | 0.9563 | 25 | 64.2 |
| 6 | 1500 | 450 | 3.5 | 103.2 | 47 | 212 | 3630 | 0.37 | 27.5 | 74.5 | 0.9541 | 20 | 64.8 |
| 7 | 1500 | 450 | 3.5 | 103.0 | 58 | 170 | 4200 | 0.34 | 23.2 | 69.0 | 0.9537 | 28 | 65.0 |
| 8 | 1500 | 450 | 3.5 | 104.5 | 76 | 207 | 3980 | 0.28 | 21.0 | 75.3 | 0.9528 | 26 | 63.4 |
| 9 | 1500 | 450 | 3.5 | 103.2 | 56 | 163 | 4100 | 0.30 | 25.6 | 86.2 | 0.9550 | 22 | 64.5 |
| 10 | 1500 | 450 | 3.5 | 105.0 | 72 | 180 | 4390 | 0.27 | 17.6 | 66.2 | 0.9518 | 43 | 64.2 |
| 11 | 1500 | 450 | 3.5 | 103.0 | 84 | 254 | 4230 | 0.30 | 24.2 | 80.1 | 0.9538 | 20 | 59.0 |
| 12 | 1500 | 450 | 3.5 | 104.7 | 106 | 200 | 4070 | 0.27 | 21.1 | 78.7 | 0.9530 | 29 | 62.2 |
| 13 | 1500 | 450 | 3.5 | 107.0 | 89 | 257 | 3920 | 0.33 | 29.6 | 88.6 | 0.9540 | 13 | 62.8 |
| 13 | 1500 | 450 | 3.5 | 107.0 | 91 | 242 | 3750 | 0.44 | 32.5 | 74.2 | 0.9536 | 19 | 64.8 |

What is claimed is:

1. A method of forming a polyolefin composite catalyst particle comprising:
   a) choosing at least two distinct supported catalyst components selected from the group consisting of chrome-silica, chrome-titania silicas, chrome-silica titania tergels, Ziegler-Nattas, metallocenes and mixtures thereof, wherein each catalyst component is capable of polymerizing a polyolefin having a differing melt index;
   b) sizing the catalyst components to achieve an average particle size sufficient to permit the distinct components to bind to one another and is in the range of 2–20μ;
   c) dispersing said distinct components in a non-reactive solvent to form a slurry; and
   d) isolating polyolefin catalyst particles from the solvent wherein the resulting particles are multicatalyst component particles comprising the at least two supported catalyst components chosen in a).

2. The method according to claim 1 wherein the order of steps b) and c) is reversed.

3. The method of forming a multi-component composite polyolefin catalyst particle according to claim 1 or 2 wherein the method further includes isolating the catalyst particle from the solvent by spray drying techniques.

4. The method of claim 1 wherein at least two supported catalytic components in a) are sized in b) by a co-milling process.

5. A composite polyolefin catalyst particle comprising
   at least two distinct supported catalyst components selected from the group consisting of chrome-silica, chrome-titania silica, chrome-silica titania tergel, Ziegler-Natta, metallocene, and mixtures thereof;
   wherein each of the supported catalyst components has a melt index potential which differs from the melt index potential of at least one other catalyst component in the composite particle such that the catalyst particle is capable of catalyzing formation of polymers having different melt indices under constant reaction conditions in a single polymerization reactor; and
   the supported catalyst components in (a) have an average particle size in the range of 2–20μ.

6. The particle of claim 5, wherein the method of making the particle comprises
   a) dispersing said distinct components in a non-reactive solvent to form a slurry; followed by
   b) sizing the catalyst components to achieve an average particle size sufficient to permit the distinct components to bind to one another and is in the range of 2–20μ.

* * * * *